March 7, 1967
R. M. WELLS
3,308,225
METHOD OF FORMING MECHANICALLY INTERLOCKED HEAT SEAL ENGAGEMENT BETWEEN A BOTTOM PLATE AND A PLASTIC CONTAINER IN A COFFEE PERCOLATOR, OR OTHER RECEPTACLE
Filed Oct. 16, 1963
FIG.1
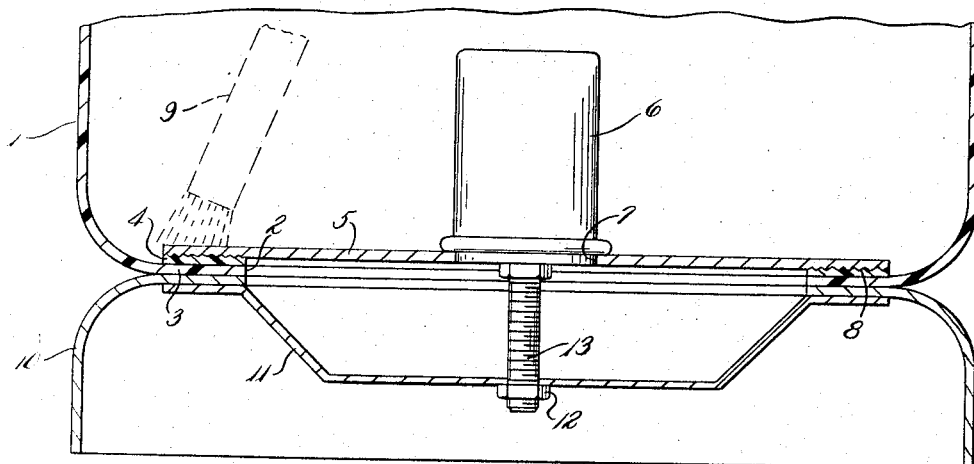
FIG.1ᵃ
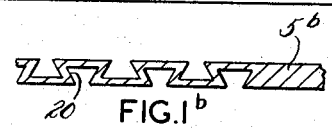
FIG.1ᵇ
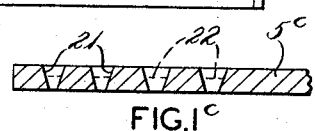
FIG.1ᶜ
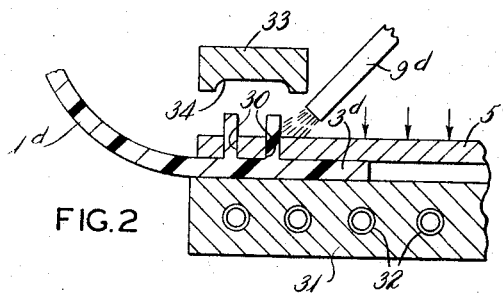
FIG.2
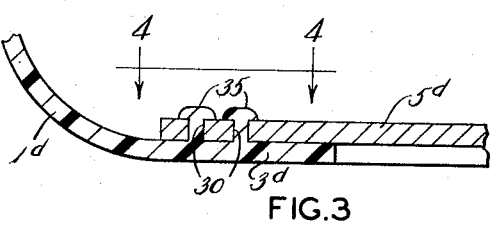
FIG.3
FIG.5     FIG.7
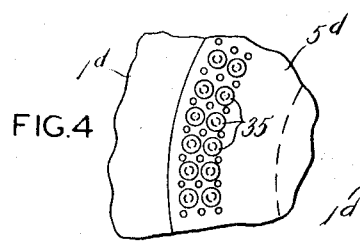
FIG.4
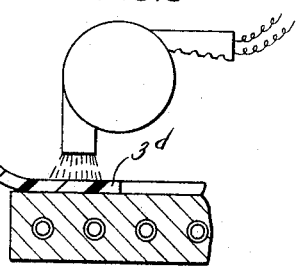
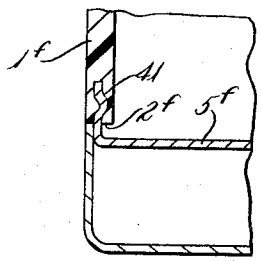
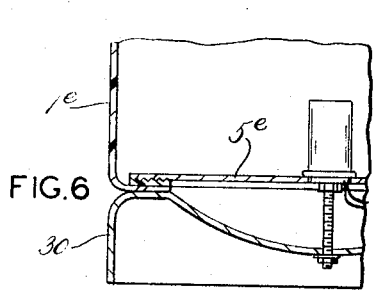
FIG.6
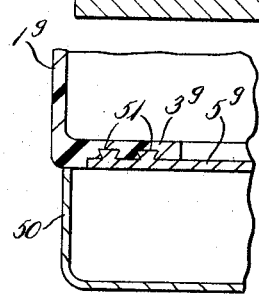
FIG.8
INVENTOR.
ROBERT M. WELLS
BY Oldham & Oldham
ATTYS.

United States Patent Office 3,308,225
Patented Mar. 7, 1967

3,308,225
METHOD OF FORMING MECHANICALLY INTER-
LOCKED HEAT SEAL ENGAGEMENT BETWEEN
A BOTTOM PLATE AND A PLASTIC CONTAINER
IN A COFFEE PERCOLATOR, OR OTHER RE-
CEPTACLE
Robert M. Wells, 4371 Ira Road, Akron, Ohio 44313
Filed Oct. 16, 1963, Ser. No. 316,666
9 Claims. (Cl. 264—249)

The present invention relates to coffee percolators and other liquid receptacles, and particularly to a new and improved method of producing a good water-tight, permanent bond between a metal bottom plate and a plastic container and to the novel article so produced.

At the present time, coffee percolators, for example, are primarily made from metal containers many of which have some type of an internal heating unit secured to a base portion of the container. Some coffee percolators made heretofore have been made from glass and some have heat supplied thereto from an external source. The present invention particularly relates to coffee percolators providing their own heat supply, but it also relates to any liquid receiving article.

It has been proposed heretofore to make coffee percolators of a less expensive design by forming the body portion portion of the container from a heat resistant, but normally thermoplastic, plastic material, which has some type of a metal base plate with an electric heater carried thereby to complete the percolator.

The general object of the present invention is to provide a novel and improved method of making a coffee percolator or other liquid receiving article where the method is characterized by the heat seal interlock formed between a metal base plate and a plastic container.

Another object of the invention is to provide a method of making a novel and improved container primarily made from a thermoplastic material, and having a metal base plate provided therein, which base plate preferably it made from a material having low heat conductivity properties, and where a special mechanical interlocked joint is provided between the metal base plate and the plastic container by a heat seal action.

A further object of the invention is to provide a method of making a novel and improved liquid containing and/or heating article wherein a thermoplastic container section is provided and where a portion of such container may be preheated to substantially the fusing or melting point of the plastic material of the container, while cooling another portion of the container, after which a metal base plate having a specially contoured section thereon is forced into engagement with the partially melted plastic of the container section whereby after cooling the heated plastic, a mechanical interlock which is liquid-tight, is obtained between the plastic and metal means in the liquid receiving article.

A further object of the invention is to bond a metal base plate to a plastic container by preheating either a portion of the container and/or the base plate to about the fusing temperature of the plastic forming the container, and to maintain the heat supply during the bonding action, if desired.

Another object of the invention is to provide a method of making an inexpensive, attractive percolator which will have good operating characteristics and will not leak fluids therefrom even though severely and repeatedly stressed by temperature changes when in use.

Attention now is particularly directed to the details of the accompanying drawings, wherein:

FIG. 1 is a fragmentary vertical section through an electric percolator unit made in accordance with the principles of the invention;

FIG. 1a is a fragmentary enlarged vertical section of a peripheral portion of a modified base plate for use in the container of FIG. 1;

FIG. 1b is an enlarged fragmentary vertical section of a peripheral portion of a further modification of the base plate shown in FIG. 1;

FIG. 1c is a fragmentary enlarged vertical section of a further modification of a base plate for use in the container of FIG. 1;

FIG. 2 is a fragmentary vertical section showing one step in a modification of the method of the invention for providing a modified article of the invention showing the initial engagement between the plastic container and the metal base plate;

FIG. 3 is a fragmentary vertical section, like FIG. 2, of the container of FIG. 2 at a further stage in the manufacture thereof;

FIG. 4 is a fragmentary enlarged plan taken on line 4—4 of FIG. 3 to show the final interlock between the container and the metal base plate;

FIG. 5 is a fragmentary enlarged vertical section showing how one surface of the container of FIG. 2 can be preheated and the other surface cooled, usually, prior to the assembly opertaion of FIG. 2;

FIG. 6 is a fragmentary vertical section of yet a further liquid receiving article made in accordance with the principles of the invention;

FIG. 7 is a fragmentary vertical section of a further heat sealed container of the invention; and FIG. 8 is a fragmentary vertical section of yet another container made by the process of the invention.

When referring to corresponding members shown in the drawings and referred to in the specification, corresponding numerals are used to facilitate comparison therebetween.

Generally speaking, the method of the present invention, in one embodiment thereof, relates to a method of making a coffee percolator, or other liquid receiving article comprising the steps of forming a container from heat resistant thermoplastic material having a melting point appreciably above 212° F., which container has an opening in a bottom wall thereof, providing, preferably, a low heat conductivity metal bottom plate for the container, which bottom plate has a section provided thereon for mechanical interlock with a plastic container to complete the container and form a fluid tight article therewith, heating at least one surface of the bottom wall of the container to a temperature approximating the fusing or melting point of the plastic material forming the container, associating the bottom wall of the container and the bottom plate and applying pressure between the container and bottom plate to engage the heated surface of the container wall with said section of the bottom plate to force some of the thermoplastic material into intimate engagement with the bottom plate, and cooling the container and the bottom plate to set some of the thermoplastic material in intimate, mechanical interlocked engagement with the bottom plate to form a permanent water-tight connection therebetween.

Attention now is particularly directed to the drawings, and a portion of a container 1 is shown. This container 1 shown is adapted for use as a coffee percolator, but can be modified for use for other purposes, as desired. In all events, the container is made from a heat resistant thermoplastic material, such as polypropylene, which has a melting point of between approximately 280° and 345° F. Other suitable heat resistant thermoplastic materials can be used as long as they have a melting point appreciably above 212° F. The container 1 has an opening or aperture 2 in a bottom wall 3 thereof. Usually the bottom wall 3 is reenforced by a ring 4 of the thermoplastic material fused thereto. The container and the opening 2 may be of any desired size and shape. Any suitable top and percolator means (not shown) may be supplied to the container to obtain the desired percolating action.

The container 1 is completed by a metal bottom plate 5 and usually heater means 6 are supported thereby, to form a water-tight enclosure. This metal bottom plate 5 can be made of any suitable shape and it is made from suitable materials, such as aluminum. However, it is desirable in many instances that the bottom plate 5 be made from a metal having low heat conductive characteristics, such as stainless steel, whereby the temperatures applied to the center portion of this bottom plate 5 are not fully conducted to the periphery thereof and the temperature of the container 1 can be maintained within desired operating limits. The bottom plate 5 usually is of a substantially uniform wall thickness throughout, and it is provided with a center hole 7 therein for receipt of the heater means 6 therein when an internal heat source is to be used.

The bottom plate 5 has a plurality of annular ribs or serrations 8 formed in a peripheral section of its lower surface.

It is a feature of the invention that the bottom plate 5 may be heated to a temperature appreciably above the melting point of the plastic material forming the container 1, which heating is effected normally prior to engagement of the bottom wall 3 and the bottom plate. Any desired heater means (not shown) may be used to preheat the ribs 8 and adjacent section, at least, of the bottom plate to a temperature, for example, of about 400° F. and to affix the heated plate to the container. Hence, portions of the container bottom wall 3 will melt or fuse slightly and flow into intimate contact with the ribs 8 of the bottom plate when the plate and container are assembled. Polypropylene, for example, is a poor heat conductor and only edge or surface portions of the container wall 3 will melt slightly when the container 1 is made from such material and assembled with the bottom plate in the manner described.

After the container has had the heated bottom plate 4 pressed thereagainst for a suitable length of time, such as about 1 to 2, or up to 4 to 5 minutes with a load of, for example, 10 to 15 lbs. being placed on the bottom plate during such time, it will be found that the heat resisting but thermoplastic material forming the container will have been melted, or reshaped at the lower end thereof to flow into a good bonded engagement with the ribs 8 of the bottom plate 5. Additional heat may be supplied to the bottom plate by an air gun discharge tube 9 during the assembly operation. Thus a sealed engagement is obtained between the bottom wall 3 of the container and the bottom plate by the pressure and heat bonding action described. Such fusing or melting of a surface of a wall of the container achieves, or provides a good bond between the plastic and metal members when connected in the manner outlined. The container wall fusing can be facilitated by suitable preheating thereof. Hence, after the several minute exposure of the container 1 to the heating and pressure action described, the heating action is terminated and the pressure on the container wall to bottom plate connection is removed. After slight cooling, if desired, the other components, necessary to complete the article to be formed from the container 1, such as a base support 10 and a pressure plate 11, can be secured thereto in a conventional manner. Such pressure plate 11 is clamped against the container bottom wall and clamps the bottom plate thereto by a nut 12 secured to a stud 13 on the heater means 6.

As previously indicated, prior to the engagement of the container 1 and the bottom plate 5, some suitable means may be used for preheating the bottom wall 3 immediately adjacent the opening 2 therein. Hence, a member, such as the hot air supply tube 9, could be introduced into the container 1 and could be manually directed against the upper surface of the plastic ring 4 and played therearound until such portion of the container 1 has been heated to a temperature at least approaching that of the melting or fusing point of the plastic material comprising the container 1. Then the bottom plate 5 is placed on top of the ring 4 and is forced downwardly thereagainst as described. Any suitable reenforcing means can be associated with the bottom portion of the container 1 at this time. Furthermore, the hot air supply tube 9 can be reintroduced into the container 1 during the engagement between the bottom plate and bottom wall of the container to provide additional heat to the bottom plate 5 while a mechanical interlock type of a heat seal or bonding action is being obtained. Such hot air supply tube 9 is connected to any conventional source of hot air supply, such as a hot air gun, or other heat supply means so that a controlled amount of heat, or air at a controlled temperature range, can be continually played on a member, such as the peripheral portion of the bottom plate 5, having the ribs, serrations, or bonding area formed therein to facilitate the desired heat seal or bonding action.

A modified bottom plate 5a is shown in FIG. 1a and it is adapted for attachment to a container 1 in the manner as shown in FIG. 1. However, in this instance, the bottom plate 5a is provided with a bonding area comprising a plurality of ribs or serrations 8a that extend completely through or are formed in the sheet forming the plate 5a to obtain larger serrations or ribs for mechanical interlocked engagement with the plastic material comprising the bottom wall 3 and a ring 4, or other reenforcing means associated with the bottom wall of the container. Of course, in any of the containers of the invention, additional plastic material need not be added to the bottom wall thereof but such reenforced or thickened plastic section in the wall adjacent the opening therein is the preferred construction of the invention.

FIG. 1b of the drawings shows yet a further modified bottom plate 5b for use in a container of the invention. In this instance, a plurality of dovetail shaped recesses or grooves 20 are provided in the lower surface of the bottom plate 5b to aid in obtaining a mechanical interlocked bonded connection between the bottom wall of the container and this bottom plate by the heat seal action described hereinabove.

A further modified base plate 5c is shown in FIG. 1c of the drawings, and in this instance, a plurality of downwardly converging openings or holes 21 are formed in the bottom plate 5c adjacent the periphery thereof. In this instance, by the heating of the plastic material forming the bottom wall of the container, and by the application of axially directed pressures to the assembly of the bottom wall and bottom plate, the plastic material will flow into and permanently seat in at least the lower portions of these apertures 21, as indicated at 22 in the drawings, so that an effective mechanical interlock and a good water-tight joint or connection is formed between the container and its bottom plate.

FIG. 2 of the drawings shows a portion of a further modified container 1d of the invention wherein, in this instance, a base plate 5d is provided that has a plurality of apertures 30 formed therein adjacent its periphery. In this instance, suitable axially applied pressures are placed on the bottom plate 5d so as to force a portion of the plastic material forming the bottom wall 3d of the container 1d up into and through these apertures 30. This action is facilitated by preheating the upper surface of this bottom wall of the container and/or by applying a blast of hot air by a tube 9d against the upper surface of the bottom plate 5d while the pressure engagement between the bottom plate and the container is established. Such additional heating action aids in obtaining the desired displacement or flow of plastic material up through these apertures 30. The bottom plate 5d may be preheated, if desired.

As it is necessary to prevent the bottom wall 3d of the container from being completely fused through or melting in the heat seal action, it is possible to cool the bottom portion of this bottom wall 3d when heating the top portion of the wall. The heat insulating and heat resisting characteristics of the material forming the container 1d facilitate such action. Hence the container 1d is placed upon a cooling block 31 that has suitable cooling tubes 32 provided therein through which a coolant can continually flow. The bottom wall 3d, adjacent the cooling block or member 31, thus can be maintained solid while the upper portion of the plastic in this bottom wall can be mechanically displaced for heat seal action.

In order to obtain the maximum strength in a mechanical interlock between the plastic from the container bottom wall 3d and the bottom plate 5d, it is desirable to bring a forming tool, preferably in the shape of a ring 33 having a concave lower surface 34 thereon, into engagement with the ends or upstanding exposed portions of the plastic forced up through the apertures 30. Such ring 33 can cause melted or fused plastic to flow together to form an annular ring 35 extending around the peripheral portion of the plate 5d on the upper surface thereof. Such a ring 35 is shown in FIGS. 3 and 4 whereby a very effective, water-tight permanent joint is provided between the bottom plate 5d and the container 1d. These apertures 30 provided in the base plate 5d may be of the same or of similar or dissimilar sizes, as desired, and usually are immediately adjacent each other in the peripheral portion of the bottom plate. If sufficient plastic does not get forced up through the apertures 30, then the forming ring 33 will at least distort some of such plastic columns to form more or less of plastic rivets engaging the bottom plate, after cooling of the plastic material.

FIG. 5 of the drawings shows how the upper surface of the plastic material forming the bottom wall 3d of the container 1d can be preheated to substantially the fusing or melting temperature thereof on its upper surface prior to engagement of the bottom plate therewith.

FIG. 6 of the drawings is of interest as it shows yet another container 1e that is provided and wherein a ribbed bottom plate 5e can be forced into interlocked engagement with the bottom wall of the container merely by a heat seal and deforming engagement action therebetween. No clamping plate need be provided in this apparatus for securing the bottom plate 5e to the container 1e for a permanent, effective connection therebetween. After heat seal or bonded engagement of the bottom plate and container, a suitable base 30 can be attached thereto.

FIG. 7 shows a container 1f the lower end, or bottom wall of which is of a relatively thick wall section adjacent an opening 2f therein. Such container wall has preferably been preheated at the lower end thereof and a preheated metal plate 5f has had its preheated vertically upwardly extending upper end 41 forced into the lower end of the container. Such metal plate end, or bonding area 41 is of zig-zag or other non-planar shape in vertical section so that it will mechanically interlock with the plastic forming the container wall when the plastic forming the wall has cooled. Any suitable pressure is applied between the container 1f and the metal plate 5f to effect the penetration of the end 41 into the container end. As only a relatively thin metal plate is used, any even rather slight working of its end 41 to non-planar form will still form an effective, liquid-tight, permanent seal between the softened plastic material in the container end and the metal plate. Any suitable cooling of the assembly will set the plastic in intimate engagement with the end 41. Usually suitably controlled heat should be supplied to the metal plate and/or to the lower end of the container 1f during the assembly of these members. The container 1f has a cup-shaped base suitably secured thereto. Any known means may be used to complete the appliance made from the container 1f. The heating of the container wall is sufficient to soften but not to melt the plastic forming such wall, or such wall has been heated to about but below its melting temperature.

A plastic container 1g that has a thick end wall 3g is shown in FIG. 8. Such container 1g engages a metal bottom plate 5g by a plurality of dove-tail shaped ribs 51 that are formed on the upper surface of the plate, as a bonding area for the plate, and are embedded in the end wall 3g. Preferably the end wall 3g and the metal plate 5g are both preheated prior to their assembly and the metal plate at least should still have heat supplied thereto during the pressurized assembly of these members. A base 50 and/or any other desired members are secured to the container or the metal plate in a known manner to complete the appliance.

By the method of the invention, it is believed that a novel and improved seal has been provided between a plastic container and a metal bottom plate therefor. This container can be completed by the use of conventional assembly techniques and articles, in any manner desired, for use in the intended manner, and it is especially adapted for use as a coffee percolator, or other beverage preparation, or serving device. Thus it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What is claimed is:

1. That method of making a coffee percolator, or other liquid receiving article, comprising forming a container from heat resistant thermoplastic material having a melting point appreciably over 212° F., which container has an opening in the bottom thereof, providing a low heat conductivity metal bottom plate for the container, which plate has a plurality of apertures therein adjacent its periphery, heating said bottom plate to a temperature appreciably above the melting point of the plastic forming said container, heating one surface of said container adjacent said opening and cooling the opposite surface of said container, applying pressure between said container and said bottom plate to engage the heated surface of said container wall with said bottom plate to force some of said thermoplastic material into and through the apertures in said bottom plate, and cooling said container to set some of the thermoplastic material in intimate contact with said bottom plate.

2. That method of making a coffee percolator, or other liquid receiving article, comprising forming a container from heat resistant thermoplastic material having a melting point appreciably over 212° F., which container has an opening in the bottom thereof, providing a metal bottom plate for the container, which plate has a plurality of apertures therein adjacent its periphery, heating one surface of said container adjacent said opening to about its melting temperature and cooling the opposite surface of said container, applying pressure between said container and said bottom plate to engage the heated surface of said container wall with said bottom plate to force portions of said thermoplastic material into and through the apertures in said bottom plate, pressing against the portions of said plastic material extending through said apertures to distort such portions while reenforcing the other surface of said container, and cooling the thermoplastic material to set it in engagement with said bottom plate.

3. That method of making a coffee percolator, or other liquid receiving article, comprising forming a container from heat resistant thermoplastic material having a melting point appreciably over 212° F., which container has an opening in the bottom thereof, providing a metal bottom plate for the container, which plate has a plurality of immediately adjacent apertures therein adjacent its periphery.

heating at least one surface of said container adjacent said opening to about its melting temperature, applying pressure between said container and said bottom plate to engage the heated surface of said container wall with said bottom plate to force portions of said thermoplastic material into and through the apertures in said bottom plate, heating said bottom plate when pressed against said container wall, deforming the heated thermoplastic material forced through the apertures to form a plurality of annular rings extending around the peripheral portion of the bottom plate on the upper surface thereof, and cooling the thermoplastic material to set it in engagement with said bottom plate.

4. That method of making a coffee percolator, or other liquid receiving article, comprising forming a container from heat resistant thermoplastic material having a melting point appreciably over 212° F., which container has an opening in the bottom thereof, providing a metal bottom plate for the container, which plate has a plurality of apertures therein adjacent its periphery, heating at least one surface of said container adjacent said opening to about its melting temperature, preheating the apertured portion of said bottom plate to above the fusing temperature of said thermoplastic material, applying pressure between said container and said bottom plate to engage the heated surface of said container wall with said bottom plate to force portions of said thermoplastic material into and through the apertures in said bottom plate, heating the thermoplastic material and apertured portion of the bottom plate to facilitate engagement of the thermoplastic material with said bottom plate, deforming the heated thermoplastic material forced through the apertures to form a plurality of annular rings extending around the peripheral portion of the bottom plate on the upper surface thereof, and cooling the thermoplastic material to form a bond between the container and the bottom plate.

5. That method of making a coffee percolator, or other liquid receiving article, comprising forming a container from heat resistant thermoplastic material having a melting point appreciably over 212° F., which container has an opening in the bottom thereof, providing a metal bottom plate for the container, which plate has a plurality of serrations therein adjacent its periphery, heating one surface of said container adjacent said opening to about its melting temperature and cooling the opposite surface of said container, applying pressure between said container and said bottom plate to engage the heated surface of said container wall with said bottom plate to force portions of said thermoplastic material into the serrations in said bottom plate, and cooling the thermoplastic material to set it in engagement with said bottom plate.

6. That method of making a coffee percolator, or other liquid receiving article, comprising forming a container from heat resistant thermoplastic material having a melting point appreciably over 212° F. which container has an opening in the bottom thereof, providing a metal bottom plate for the container, which plate has a rough surfaced bonding area provided therein adjacent its periphery for association with said container adjacent the opening therein, heating one surface of said container adjacent said opening to about its melting temperature and cooling the opposite surface of said container, assembling said bottom plate and the heated surface of said container, applying pressure between said container and said bottom plate to engage the heated surface of said container wall with said bottom plate to force portions of said thermoplastic material into the bonding area in said bottom plate, and cooling the thermoplastic material to set it in engagement with said bottom plate.

7. That method of making a coffee percolator, or other liquid receiving article, comprising forming a container from heat resistant thermoplastic material having a melting point appreciably over 212° F., which container has an opening in the bottom thereof, providing a metal bottom plate for the container, which plate has a bonding area provided therein adjacent its periphery for association with said container adjacent the opening therein to cover such opening.

heating one surface of said container adjacent said opening to about its melting temperature, cooling the opposite surface of said container, and preheating said bottom plate, assembling said bottomplate to the heated surface of said container with said bottom plate extending over said opening and with said bonding area engaging said container surface, applying pressure between said container and said bottom plate to force portions of said bonding area into the thermoplastic material forming said container to displace some of such material, and heating said bottom plate while continuing the pressure between said bottom plate and said container to form an interlock therebetween.

8. That method of making a coffee percolator, or other liquid receiving article, comprising forming a container from heat resistant thermoplastic material having a melting point appreciably over 212° F., which container has an opening in the bottom thereof, providing a metal bottom plate for the container, which plate has a bonding area provided therein adjacent its periphery for association with said container adjacent the opening therein to cover such opening, heating one surface of said container adjacent said opening to its softening temperature, cooling the opposite surface of said container, and preheating said bottom plate, assembling said bottom plate to the heated surface of said container with said bottom plate extending over said opening and with said bonding area engaging said container surface, and applying pressure between said container and said bottom plate to force portions of said bonding area into the thermoplastic material forming said container and obtain a mechanical interlock therebetween.

9. That method of making a coffee percolator, or other liquid receiving article, comprising forming a container from heat resistant thermoplastic material having a softening point appreciably over 212° F., which container has an opening in a lower end wall thereof, providing a metal bottom plate for the container, which plate has a bonding area provided therein adjacent its periphery and extending vertically therefrom for association with said container adjacent the opening therein to cover such opening, heating the lower end of said container adjacent said opening to soften it while cooling the opposite surface of said end, and preheating said bottom plate to at least the temperature of the container surface, assembling said bottom plate to the heated end wall of said container with said bottom plate extending over said opening, and with said bonding area engaging said container end wall, and applying pressure between said container and said bottom plate to force portions of said bonding area into the thermoplastic material forming said end wall of said container and mechanically interlock said container and bottom plate.

References Cited by the Examiner

UNITED STATES PATENTS

| | | | |
|---|---|---|---|
| 90,154 | 5/1869 | Byron | 264—249 XR |
| 272,033 | 2/1883 | Edge | 264—273 |
| 1,934,256 | 11/1933 | Bronson | 264—273 XR |
| 2,809,399 | 10/1957 | Mead et al. | 264—249 XR |
| 2,949,642 | 8/1960 | Lieberman | 264—274 |
| 2,969,890 | 1/1961 | Udell | 220—69 |
| 3,030,255 | 4/1962 | Winston | 264—273 |
| 3,074,117 | 1/1963 | Carpenter et al. | 156—303.1 |
| 3,080,615 | 3/1963 | Carlson et al. | 156—303.1 |
| 3,143,242 | 8/1964 | Mulder | 220—69 |
| 3,146,286 | 8/1964 | Freed | 264—274 |

ROBERT F. WHITE, *Primary Examiner.*

GEORGE E. LOWRANCE, *Examiner.*

R. A. JENSEN, T. J. CARVIS, *Assistant Examiners.*